May 9, 1944.　　　　P. E. McKAMY　　　　2,348,635
LOCOMOTIVE TRUCK
Filed Nov. 18, 1941　　　　2 Sheets-Sheet 1

Inventor:-
Paul E. McKamy
by Edward W. Hathaway
his Attorney

May 9, 1944.  P. E. McKAMY  2,348,635
LOCOMOTIVE TRUCK
Filed Nov. 18, 1941  2 Sheets-Sheet 2

Inventor:-
Paul E. McKamy
by his Attorney

Patented May 9, 1944

2,348,635

UNITED STATES PATENT OFFICE 2,348,635

LOCOMOTIVE TRUCK

Paul E. McKamy, Chicago, Ill., assignor to The Whitcomb Locomotive Company, a corporation of Delaware Application November 18, 1941, Serial No. 419,616

1 Claim. (Cl. 105—82)

This invention relates generally to trucks and more particularly to driving trucks for small size locomotives in which power is applied to one axle and then transmitted to a second axle through side rods.

Four wheel trucks in which the two axles are connected by side rods have heretofore been subject to the objection that the axles do not maintain a constant distance between centers when riding over irregularities in a track and accordingly the side rods which are of fixed length have undue stresses imposed upon the same.

It is an object of my invention to provide an improved truck for minimizing the possibility of undue stresses being imposed upon the side rods. A further object is to provide an improved truck in which a constant distance is maintained between centers of the axles while still allowing the same to have a high degree of flexibility in riding over track irregularities and yet avoid excessive strains upon the side rods as well as upon their journal bearings.

A further object is to provide an improved pedestal arrangement for cooperating with the means for maintaining a constant distance between axle centers.

Other objects and advantages will be more apparent to those skilled in the art from the following description of the accompanying drawings in which.

Figure 2:
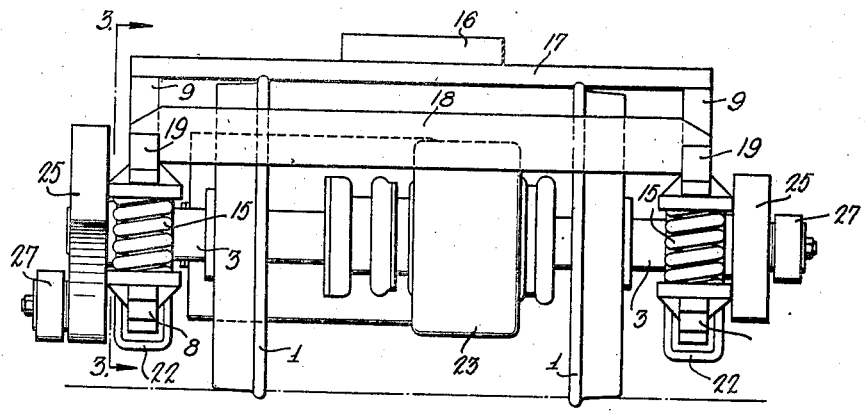
Fig. 2 is an end view of the right end of Fig. 1.
Figure 1:
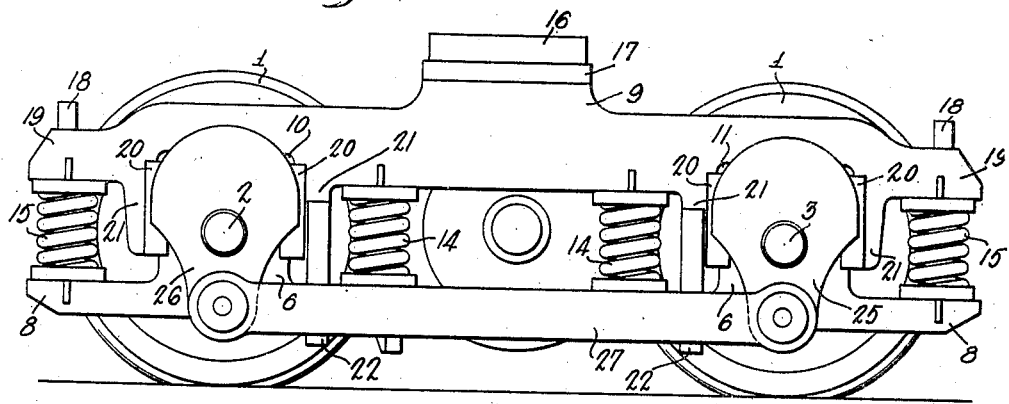
Fig. 1 is a side elevation of my improved truck.
Figure 3:
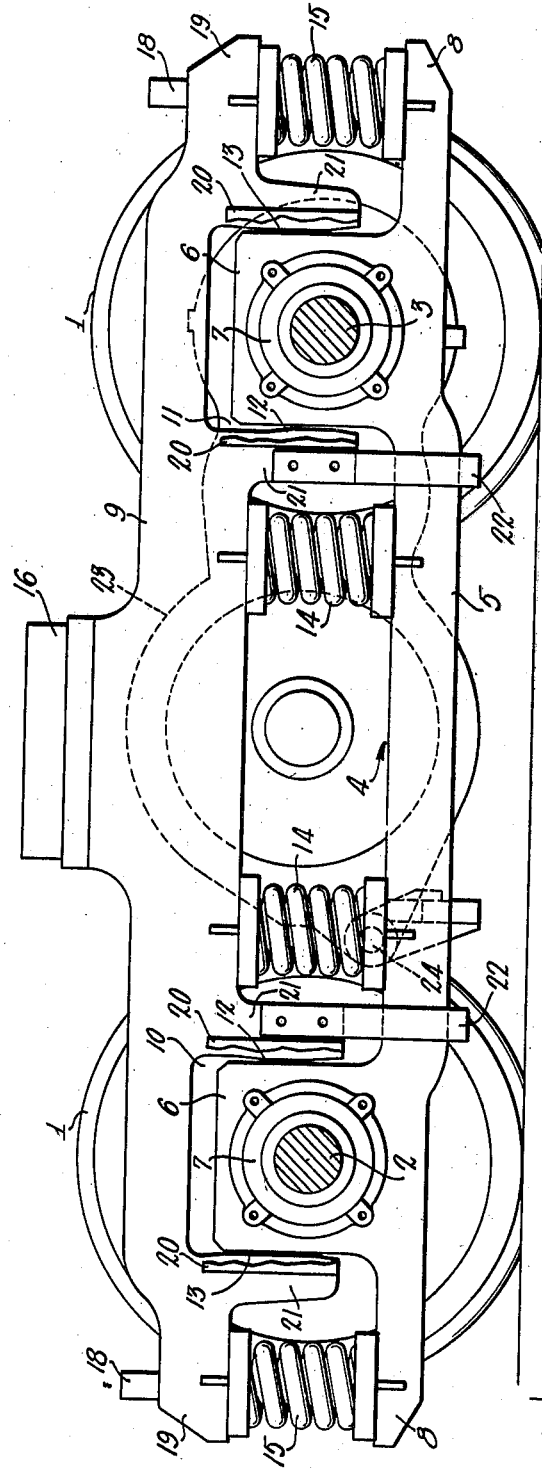
Fig. 3 is an enlarged vertical section taken substantially on the line 3—3 of Fig. 2 with parts broken away to show details of construction.

My improved truck comprises broadly upper and lower parts, the lower portion of which consists of two pairs of wheels 1 mounted respectively on axles 2 and 3. These axles are maintained at a constant distance between their centers by the provision of combining the functions of a journal box and spring equalizer into one unitary element which may herein be broadly described as a journal-equalizer generally indicated at 4. This consists of an elongated member 5 having integrally formed upwardly extending journal housings 6 in which journal bearings 7 are firmly secured. Spring suspension arms 8 are also formed integrally with the journal-equalizer element. From this disclosure it is seen that the distance between centers of the two axles will remain constant at all times regardless of whether one wheel moves above or below the elevation of the other wheel. It will of course be understood that the truck is symmetrical about its longitudinal centerline with journal boxes at each end of the axles and with a journal-equalizer unit at each side of the truck. Hence, the description of one side will suffice for both.

The truck frame proper consists of wheel pieces 9 having downwardly extending pedestal openings 10 and 11 into which the journal housings 6 extend upwardly, it being noted that the lower ends of the pedestal openings are not closed by a usual pedestal cap. To allow swinging movement of either axle about the other axle and still maintain an adequate pedestal guiding action on the journal boxes, I have provided a curved pedestal shoe surface 12 at the inner sides of the two pedestal openings 10 and 11 while the outer sides 13 are also curved to allow swinging movement of the journal housings. These pedestal surfaces are preferably cut to an arc whose radius is equal to the center distance of the axles thus allowing one axle to pivot on the other axle when passing over track irregularities.

Interposed between the upper part 9 and the lower part 4 is a pair of coil springs 14 located between the axles while another pair of springs 15 is located beyond the axles. Also a usual center pin bearing 16 is formed on any usual bolster or transom 17, Fig. 2, while transverse frame members 18 connect the spring supporting portions 19 on the upper frame. To laterally hold the journal boxes 6 in position usual pedestal strips 20 may be bolted or otherwise suitably secured to the sides of the pedestal jaws 21. Also U-shaped straps 22 are connected to the inner jaw of each pedestal so as to extend downwardly and thence upwardly beneath and around the journal connecting member 5 thus preventing abnormal separation of the upper and lower truck parts.

One of the axles is preferably driven by a usual electric motor 23 supported in any customary manner upon one of the axles such as 3 and is connected thereto for driving the same through usual pinion and gears while the torque of the motor is resisted by a pin 24 connected to the journal connecting member 5 disposed on one or the other or both sides of the truck. Power is transmitted from axle 3 to axle 2 through usual counterbalanced crank arms 25 and 26 connected by a side rod 27, there being one such rod on each side of the truck.

From the foregoing disclosure it is seen that if one set of wheels should move upwardly or downwardly while the other wheel remains at a substantially constant elevation the journal-equalizer unit will maintain the axles at a fixed distance apart thereby insuring uniform operation of the side rods 27 without imposing undue stresses therein. This freedom of action and constancy of operating distances is obtained together with permitting maximum flexibility of the spring suspension system while insuring uniform load distribution from the upper frame 9 through the sets of preferably equally spaced springs 14 and 15 to the journal-equalizer unit.

Thus it is seen that I have provided a driving truck that is particularly well adapted to small size industrial locomotives in which the trucks are of relatively small size and incur extremely severe service conditions such as highly irregular tracks and sharp curves. My improved truck may be built in a manner that is not only economical but is also highly compact, simple and extremely rugged and durable.

It will of course be understood that various changes in details of construction and arrangement of parts may be made by those skilled in the art without departing from the spirit of the invention as set forth in the appended claim.

I claim:

A truck comprising, in combination, a pair of wheeled axles, a journal-equalizer unit having upwardly extending journal boxes in which said axles are journalled and being adapted to maintain the axles a constant distance apart at all times, a truck frame having side pieces superimposed directly over said journal equalizer unit to provide opposed spring seating surfaces on said unit and side pieces, said truck frame also having downwardly extending pedestal openings with lower open ends to receive said upwardly extending journal boxes side rods and cranks connecting said axles together so that one may be driven by the other, whereby one axle may pivot about the other axle while maintaining at all times a substantially constant relationship between the axle centers and side rods, the guiding surfaces of said pedestal openings and the sides of said journal boxes being so relatively shaped that the distance between the sides of the pedestal and the box is greater at the upper and lower ends of the box than at the intermediate portion thereof thereby to allow the upper corner on one side of the journal box and the other opposite corner of that journal box to have free movement within the pedestal opening during pivotal action of the journal-equalizer unit while still maintaining a guiding relationship with the sides of the pedestal openings, and springs interposed between and seated against said opposed surfaces of said side pieces and journal equalizing unit.

PAUL E. McKAMY.